United States Patent
Zimmer et al.

(10) Patent No.: US 7,478,176 B2
(45) Date of Patent: Jan. 13, 2009

(54) MANAGING PERIPHERAL DEVICE ADDRESS SPACE RESOURCES USING A TUNABLE BIN-PACKING/KNAPSACK ALGORITHM

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/689,954

(22) Filed: Mar. 22, 2007

(65) Prior Publication Data

US 2007/0186014 A1    Aug. 9, 2007

Related U.S. Application Data

(62) Division of application No. 10/664,623, filed on Sep. 19, 2003, now Pat. No. 7,243,167.

(51) Int. Cl.
*G06F 3/00* (2006.01)

(52) U.S. Cl. .................................. 710/8; 710/9; 710/10

(58) Field of Classification Search ................ 710/8–10
See application file for complete search history.

(56) References Cited

U.S. PATENT DOCUMENTS

| | | | |
|---|---|---|---|
| 5,894,563 A | | 4/1999 | Saperstein |
| 6,202,147 B1 * | | 3/2001 | Slaughter et al. ............... 713/1 |
| 6,434,694 B1 * | | 8/2002 | Slaughter et al. ............... 713/1 |
| 6,542,953 B2 | | 4/2003 | Porterfield |
| 6,587,868 B2 | | 7/2003 | Porterfield |
| 6,678,770 B1 | | 1/2004 | Sutoh |
| 6,748,512 B2 * | | 6/2004 | Buch et al. ................... 711/202 |
| 6,823,418 B2 | | 11/2004 | Langendorf et al. |
| 7,243,167 B2 | | 7/2007 | Rothman et al. |
| 2002/0016862 A1 | | 2/2002 | Porterfield |
| 2002/0016877 A1 | | 2/2002 | Porterfield |
| 2002/0073296 A1 * | | 6/2002 | Buch et al. ................... 711/202 |
| 2004/0215864 A1 | | 10/2004 | Arimilli et al. |

OTHER PUBLICATIONS

"Final Office Action Mailed Jan. 8, 2007 for U.S. Appl. No. 10/664,623".
"Office Action Mailed Jul. 13, 2006 for U.S. Appl. No. 10/664,623".

* cited by examiner

*Primary Examiner*—Niketa I Patel
*Assistant Examiner*—David E Martinez
(74) *Attorney, Agent, or Firm*—Blakely, Sokoloff, Taylor & Zafman LLP

(57) ABSTRACT

Methods and systems for allocating address space resources to resource requesting peripheral devices in an efficient manner. Resource requests are gathered for enumerated peripheral devices host by a computer platform. A map containing resource alignment requirements is built, and a virtual resource allocation map is computed based on aggregated resource requests and the alignment requirements. The resource aggregations are, in turn, based on a hierarchy of the peripheral devices. A bin-packing algorithm is employed to determine allocation of the resource requests so as to minimize resource address space allocations. The virtual resource map is then used to perform actual resource allocations. The resources include peripheral device I/O address allocation and peripheral device memory address allocations.

14 Claims, 9 Drawing Sheets

```
knapSack_k(C,S)  // S an array with n values (the sizes)
    int maxSum, sum, j;  // C is the size of the knapsack
    Set T = new Set;
    take = ∅; maxSum = 0;
    for each subset T ⊆ {1,...,n}
                        with k elements {
        sum = the sum of the values S[i] such that i ∈ T;
        if (sum ≤ C) {
                for each j not in T {
                if (sum + S[j] ≤ C){
                    sum = sum + S[j];
                    T = T ∪ {j};}
                }
                if (maxSum < sum) {maxSum = sum}
        }
    }   return maxSum;
```

*Fig. 8*

MANAGING PERIPHERAL DEVICE ADDRESS SPACE RESOURCES USING A TUNABLE BIN-PACKING/KNAPSACK ALGORITHM

This application is a divisional of U.S. patent application Ser. No. 10/664,623, filed Sep. 19, 2003 now U.S. Pat. No. 7,243,167.

FIELD OF THE INVENTION

The field of invention relates generally to computer systems and, more specifically but not exclusively relates to technique for efficiently allocating address space resources to support peripheral device operations.

BACKGROUND INFORMATION

An important function provided by computer systems is the ability to interact with internal and external components. This functionality, generally categorized as input/output (I/O) operations, is facilitated by hardware architecture, such as buses and device interfaces, in combination with software and firmware components that execute on the computer system's processor(s). Exemplary I/O devices include input devices, such as mice and keyboards, and peripheral devices, such as disk drives, CD-ROM drives, DVD drives, network interfaces, audio devices, and video displays.

One area of concern for early hardware engineers and software designers was the lack of consistency between hardware device interfaces. The software designers desired an interface standard that would simplify designing device drivers, while the hardware engineers desired a flexible platform interface. In the early 1990's, the Intel® Corporation led an industry effort to develop a peripheral device interface standard that was designed to address both of these problems. The standard interface is known as the Peripheral Component Interconnect (PCI) architecture.

FIG. 1 shows a portion of a typical PCI bus configuration 10 illustrative of the PCI architecture. PCI Bus configuration 10 includes a host bus 12 to which a host CPU 14, host memory 16, and cache 18 are connected. In general, for a given system, host CPU 14 will be the primary bus master for the system, and will be used to service interrupts and handle system errors. As illustrated in FIG. 1, the various buses in a system comprise a hierarchy that includes one or more levels, wherein buses at a lower level are subordinate to buses at a higher level. The first subordinate bus level below the host bus is the root bus, which is labeled PCI Bus 0 in PCI bus configuration 10. Additional levels depicted in FIG. 1 include a level 1, a level 2, and a level 3.

Buses between levels are enabled to communicate with one another through the use of "bridges." The primary purpose of a "bridge" is to interface one bus protocol to another. The protocol includes the definition of the bus control signal lines, and data and address sizes. For example, a host/PCI bridge 0 is used to enable communication between host bus 12 and PCI bus 0. Under conventional terminology, a bridge is labeled to correspond to its subordinate bus, i.e., a bridge "n" will correspond to a PCI Bus "n" or other type of Bus "n." When a bridge interfaces similar bus types, the bridge primarily limits the loading on each bus. Instances of these types of bridges are illustrated by the various PCI/PCI bridges in FIG. 1. PCI Bus configuration 10 also includes several PCI peripheral devices, including a modem 20, a sound card 22, and a network card 24. For clarity, many of the buses shown in bus configuration 10 are depicted as not being connected to any devices; it will be recognized that each of the buses may support one or more devices.

In order to interface with ISA (industry standard architecture) peripherals and other legacy components, a legacy bus 26 is provided, which communicates with PCI bus 0 via a PCI/legacy bridge 28. Under another common configuration, a legacy bus may be connected directly to a host bus using an appropriate host bus/legacy bus bridge. The legacy bus enables the system to use various legacy devices and peripherals, such as ISA cards, legacy disk controllers, keyboards, mice, and video cards, as depicted in a legacy device block 30. Under many systems, the legacy bus must be enabled prior to other buses to successfully boot the systems.

In addition to the single root-bus hierarchy of FIG. 1, a PCI bus configuration may employ multiple root buses. For example, FIG. 2 illustrates an exemplary multiple root bus configuration 32 that includes three root busses, respectively labeled root bus 0, root bus 1, and root bus 2. Each root bus includes several layers of subordinate busses connected by corresponding bridges, which are identified by the blocks labeled "BR#" in FIG. 2. In addition, various devices, depicted as blocks containing a "D," are also included in configuration 32, as well as legacy devices 30 and a PCI-to-Legacy bridge 28.

PCI defines three address spaces: PCI I/O, PCI memory, and PCI configuration space. The PCI I/O space is used to store driver code via which corresponding hardware devices are accessed, while the PCI memory space is used to map memory resources used by a PCI device (such as a video card). From the architecture standpoint, each PCI bridge is considered an additional PCI device for which memory resources must also be allocated.

Like all memory, the PCI I/O and PCI memory spaces are finite, and oftentimes scarce. Under conventional practice, the BIOS code for Intel® systems (and the PCI Fixup code for non-Intel® systems) is employed to allocate each hardware device an amount of memory requested by that device. Additionally, both PCI I/O and PCI Memory must be allocated to a device in a naturally-aligned way. For example, if a device asks for 0xB0 of PCI I/O space then it must be aligned on an address that is a multiple of 0xB0. Furthermore, the PCI I/O and PCI Memory buses for any given bridge must be aligned on 4K and on 1 Mbyte boundaries, respectively. In addition, the address spaces for downstream devices must lie within all of the upstream PCI-PCI Bridge's memory ranges for any given device. These requirements make efficient allocation of address space for I/O devices difficult.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 8 is a listing of a $K^{th}$ approximation knapsack algorithm that is employed for bin-packing in accordance with one embodiment of the invention.

DETAILED DESCRIPTION OF PREFERRED EMBODIMENTS

Embodiments of methods and apparatus for efficiently allocating memory to support I/O devices are described herein. In the following description, numerous specific details are set forth, such as embodiments that employ the PCI architecture, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention provides a mechanism for efficiently allocating memory resources used in connection with platform components and peripheral devices and the like. To better explain problems of today's conventional approach to memory resource allocation, attention is drawn to FIG. 3, which shows a typical platform address space allocation scheme 300 for a platform employing a 32-bit address space, such as a platform that employs an Intel® IA (Intel Architecture)-32 processor.

Under a flat 32-bit addressing scheme, platform addresses (both physical and virtual) may include any address within the range from 0 to 4 Gigabytes (G). Addressable platform components include system memory, peripheral device-hosted memory (e.g., ROMs and local RAM), and fixed addressed components, such as platform firmware storage devices and chipsets. Typically, a portion of the address space will be reserved for platform hardware, while the remaining address space is left to the operating system. For instance, the illustrated embodiment reserves the top 32 megabytes (Meg) of memory to resources having fixed decoding (i.e., fixed predetermined addresses), while the remaining memory is left for the operating system (OS). Under one common operating system deployment, such as Microsoft Window® 95, 98, 2000, or XP, the OS controls the address space from 0-3G.

Figure 3:
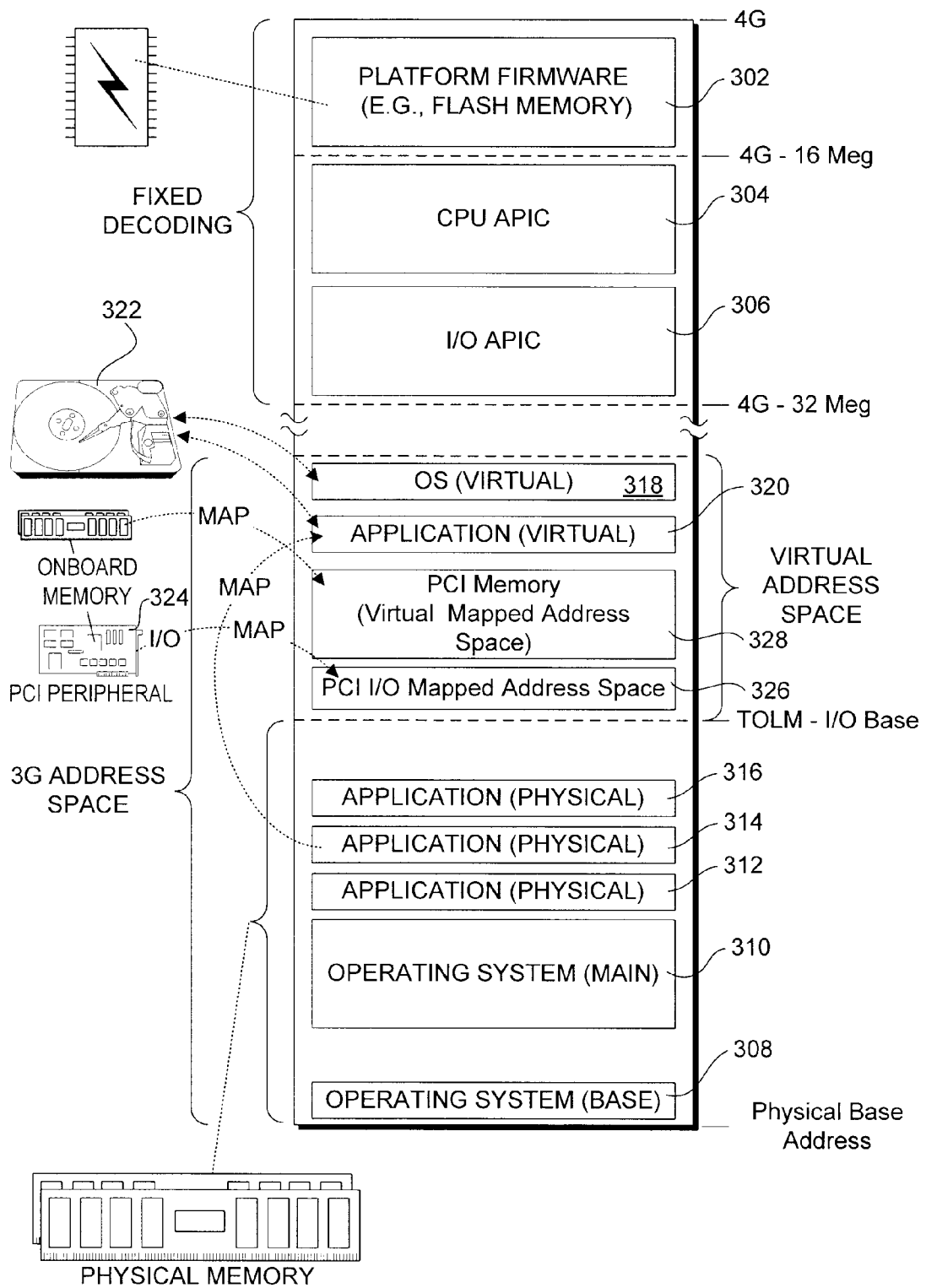
FIG. 3 is a schematic diagram of an exemplary address space for a 32-bit computer platform.

As shown in FIG. 3, the addresses in the upper portion of the 4 gigabyte address space are allocated to fixed address decoding. The top 16 megabytes of the fixed decoding address range is allocated to platform firmware storage 302. For example, modern platforms typically employ flash memory to store platform firmware; the addresses for the flash memory are configured such that the base address of the flash memory is located at 4G minus the size of the device's address space. The next portion of the fixed decoding address space is allocated for other platform hardware, including the processor (CPU) and chipset. As depicted in FIG. 3, these include fixed address allocations for a processor advanced programmable interrupt controller (APIC) 304 and an I/O APIC 306. Additional fixed decoding allocations not shown include hardware memory resources, such as caches and the like.

As discussed above, the lower portion of the address space is reserved for the operating system. The amount of memory space allocated to the OS may represent a fixed amount, or may be dependent on the particular fixed decoding memory consumption. A subset of the OS-allocated address space is used to map the addresses of physical memory. The physical memory comprises the general memory used by the system, and typically comprises some type of RAM (random access memory) technology, such as DRAM (dynamic RAM), DDR-RAM (double data rate RAM), etc. The physical memory is commonly referred to simply as "system memory."

The system memory comprises "real" memory—that is, memory that physically exists at corresponding physical addresses. The address space for system memory typically spans from a base address of 0 to the size of the physical memory. This watermark is commonly referred to as the top of low memory (TOLM). As discussed below, TOLM also marks the base address of the I/O memory that is allocated during system and OS initialization.

System memory is used to store operating system and application code, as well as data accessed by the OS and application code. During platform initialization, the operating system is booted by loading an OS image from a local storage device or a network into system memory. Typically, rather than occupying a contiguous memory addresses, the OS code is loaded in a manner such that it is partitioned into different memory locations. For simplicity, this is illustrated by an OS base component 308 and an OS main component 310—it will be recognized by those skilled in the OS arts that additional operation system components may be scattered throughout system memory.

In addition to storing the OS, system memory is also used to store application code and data accessed by those applications. For simplicity, address ranges allocated to respective applications are depicted as application physical memory allocations 312, 314, and 316.

In addition to physical system memory, modern operating systems employ "virtual" memory. In short, virtual memory is actually physical memory and/or storage that is mapped to a different (the virtual) address. Operating systems employ virtual memory for many reasons, and virtual address mapping enhances many operating system operations. One of these reasons concerns address consistency. Under this notion, an OS driver or component may be coded such that it provides an interface with predetermined addressing. Since the size of physical memory for a platform may vary, it isn't a viable option to store the driver or components with physical memory addresses alone. Under virtual addressing, the driver or component, shown at 318, may be mapped to a predetermined virtual address that is expected to be above the platform's TOLM. Another advantage with virtual memory is that it enables other types of storage to function as extended system memory. For instance, virtual memory pages 320 allocated to application 314 may be swapped out to a local hard disk 322, or even a network storage device.

One portion of the virtual address space is used for mapping I/O resources that are employed in connection with PCI device operations, such as for a PCI peripheral device 324. This portion is depicted as I/O mapped address space 324. In brief, the addresses in I/O mapped address space 326 are mapped to corresponding I/O addresses hosted by a given PCI device by programming the base address registers (BAR) of the PCI device.

Another portion of the virtual address space is used for mapping onboard memory hosted by peripheral devices to virtual address space, as shown by PCI memory 328. In this manner, memory resources hosted by a peripheral device may be accessed via calls to the virtual address to which the peripheral device memory resources are mapped.

As discussed above, during platform initialization, a memory allocation scheme is implemented to allocate each PCI device an amount of memory requested by that device. During this process, the memory must be allocated in a manner that keeps memory boundaries aligned. While these requirements are obtained using conventional practices, the resultant packing of the memory allocations often produces holes that cannot be used by other system or operation system components. This is inefficient.

Figure 1:
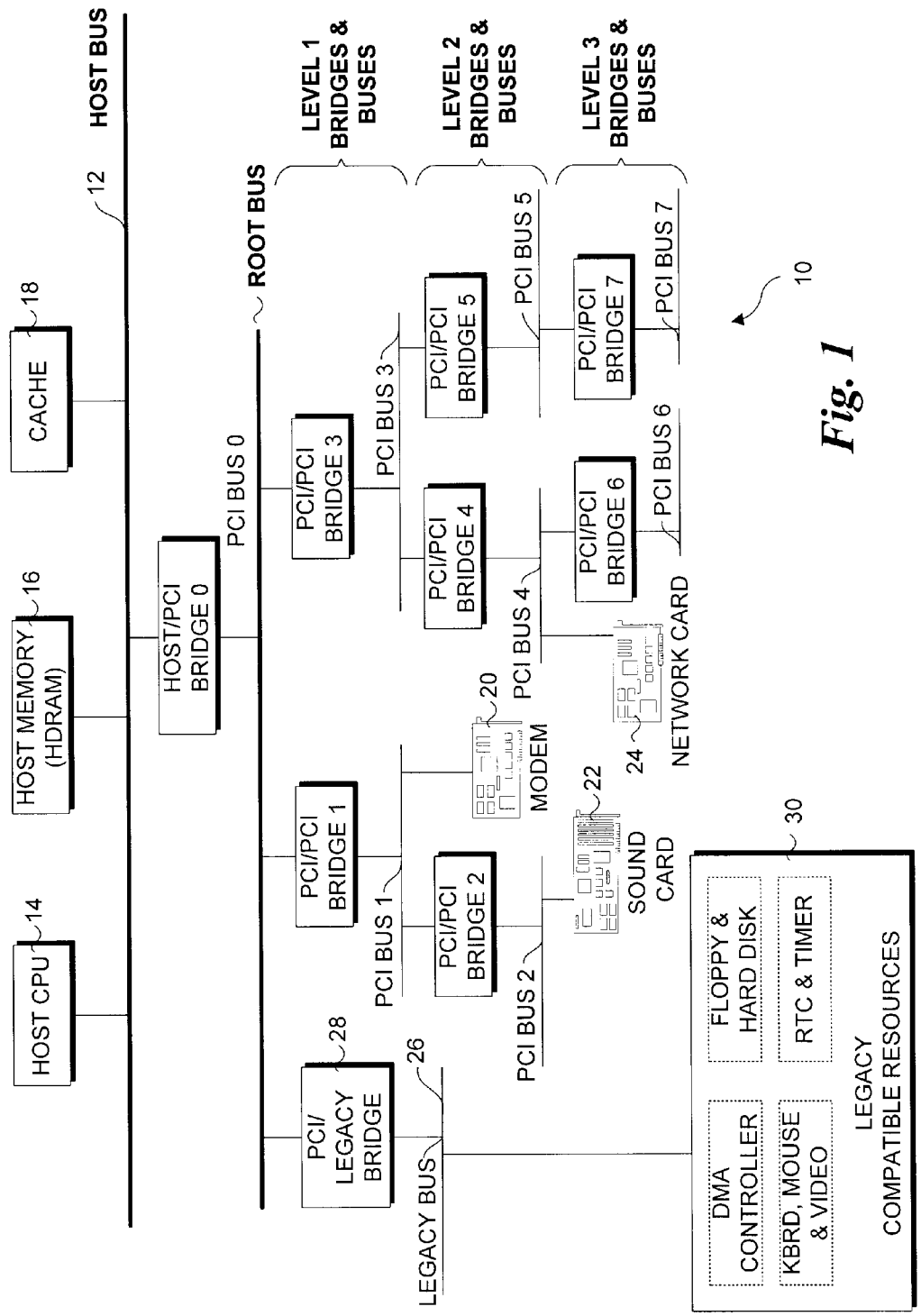
FIG. 1 is a schematic block diagram illustrating an exemplary PCI hierarchy for a computer platform having a single PCI root bridge.
Figure 2:
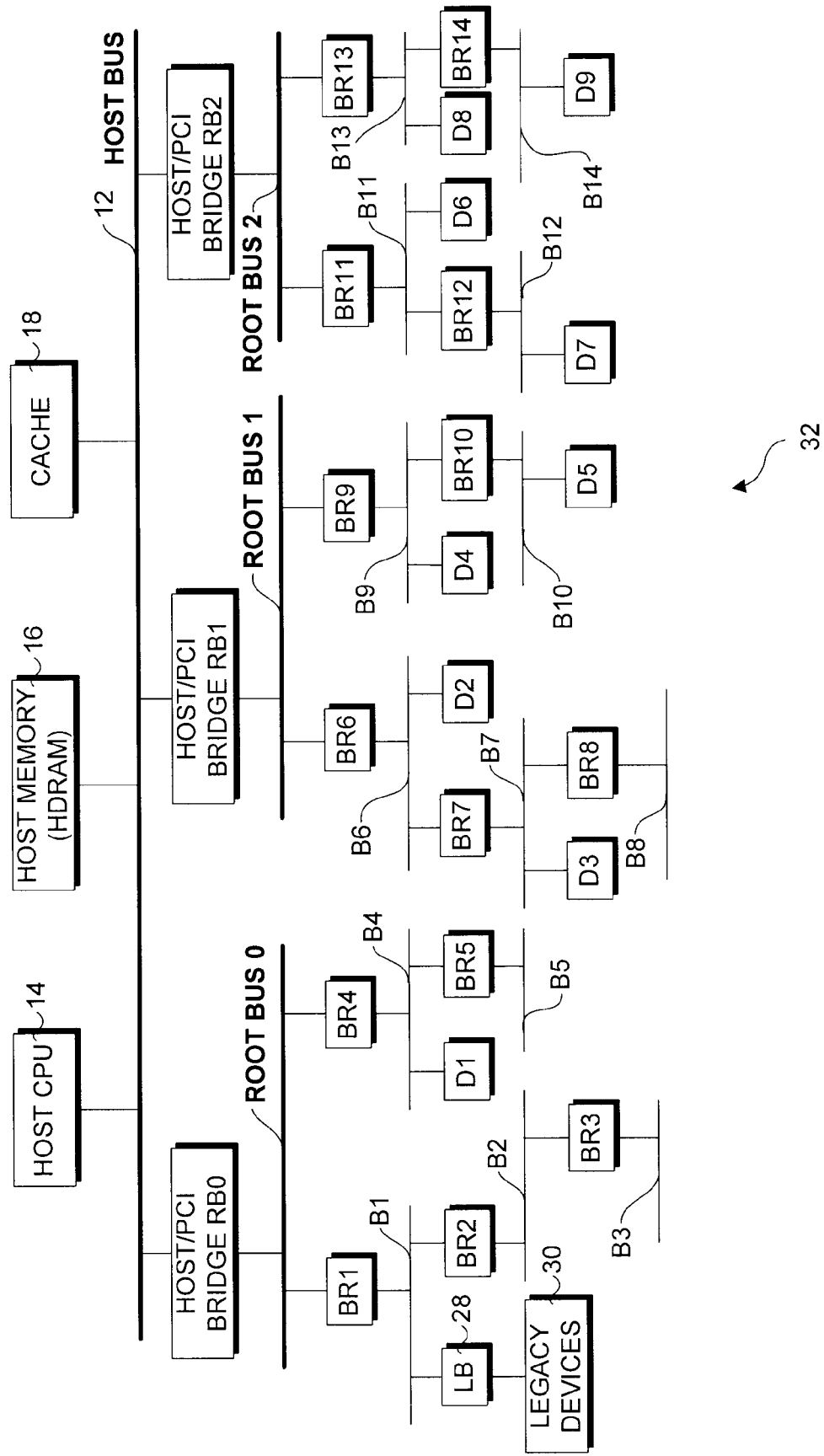
FIG. 2 is a schematic block diagram illustrating an exemplary PCI hierarchy for a computer platform having multiple PCI root bridges.
Figure 4:
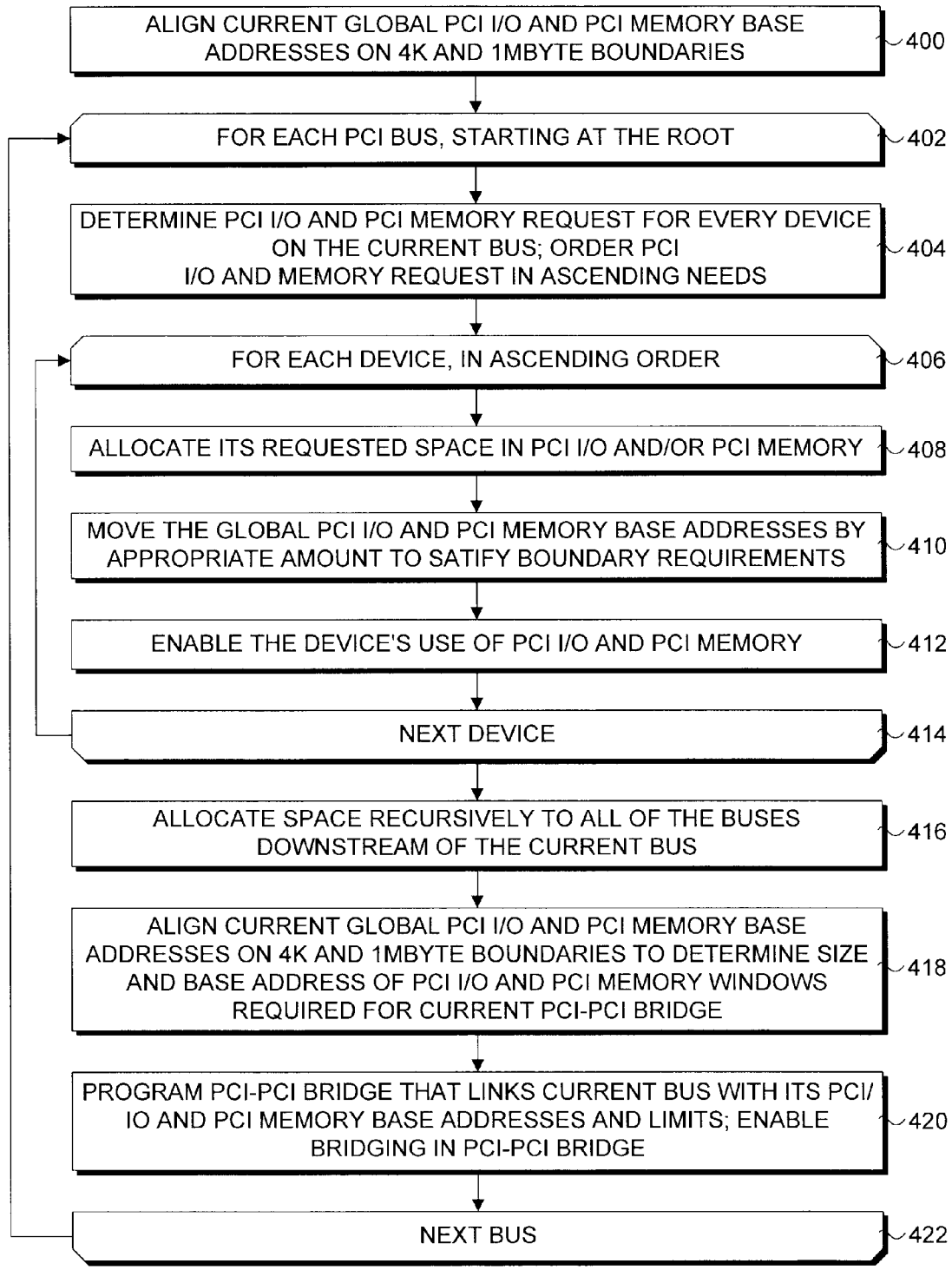
FIG. 4 is a flowchart illustrating operation and logic performed during a conventional PCI resource allocation process.

Under one conventional practice, memory resource requests for PCI devices under each root bus in a PCI configuration are allocated "on the fly" by "walking" the branches in the PCI hierarchy. During initialization, PCI devices are identified and enumerated in the manner described above with reference to FIG. 2. The configuration data are then stored in a tree data structure. During memory allocation the tree data structure is traversed, beginning at the root bridge, with memory being allocated on each bridge level in the following manner, as depicted in the flowchart of FIG. 4.

The conventional PCI memory allocation process begins in a block 400, wherein the current global PCI I/O and memory base addresses are aligned on 4K and 1 Mbyte boundaries, respectively. An outside loop delineated by start and end blocks 402 and 422 define a set of operations that are performed for each PCI bus, beginning at the root and recursing down the tree. In a block 404, the PCI I/O and memory request for each device on the current bus are determined. Each set of PCI I/O and memory requests are then ordered in ascending order.

The next set of operations, as shown by an inner loop delineated by start and end loop blocks 406 and 414 are performed for each PCI device, in the ascending order. In a block 408, the requested memory for the PCI I/O and/or PCI memory is allocated. The global PCI I/O and PCI memory base addresses are then moved by appropriate amounts to satisfy the respective boundary requirements in a block 410. Generally, the amount of movement will be a function of the memory request for the corresponding device and the necessary offset to form a natural alignment with the request. The use of the PCI I/O and/or PCI memory is then enabled for the device in a block 412. The logic then loops back to process the next device in the ascending list.

Next, after memory has been allocated for all of the PCI devices on the current bus level, memory space is allocated recursively to all of the buses downstream (i.e., at lower levels) of the current bus in a block 416. In a block 418, the current global PCI I/O and PCI memory base addresses are then realigned to the next 4K and 1 Mbyte boundaries to determine the size and base address of the PCI I/O and PCI memory windows required for the current PCI-PCI bridge. The PCI-PCI bridge that links the current bus is then programmed with its PCI I/O and PCI memory base addresses and limits in a block 420, and the bridging of the PCI-PCI bridge is enabled. The processes defined for blocks 404-420 are then repeated for the next bus, which becomes the new current bus.

Another aspect of PCI I/O and memory address allocation concerns allocation for platforms having multiple PCI root bridges. In essence, the scheme of FIG. 4 (or a similar scheme) is employed to determine the amount of address space required for all of the PCI devices under the hierarchy of each PCI root bridge. Under some schemes, address space is allocated on a sequential block-wise basis based on the required space and boundary alignment considerations. For example, as is common practice, memory is allocated to fit into memory blocks having fixed-spaced boundaries. For instance, a typical block size may span an address space of 4, 8, 16, 32, 64, 128, etc. megabytes. Address allocations for individual PCI devices and bridges are made via offsets from the base address of the block to which the "parent" root bridge for those devices is assigned.

Under conventional practices, sequential block-based address space allocations often lead to wasted resources—that is, significant portions of one or more blocks are left unused. This is a result, in part, of only considering resource requirements on an individual basis, whereby resources are allocated as they are encountered. Furthermore, allocations for run-time configuration changes are rarely provisioned in an efficient manner, if at all.

In contrast, embodiments of the present invention consider collective resource requirements prior to allocation of such resources. This provides a more efficient allocation scheme. This enables PCI I/O and memory resource allocations to be made in a manner that requires less space than conventional schemes. In one embodiment, the method employs a bin-packing algorithm that efficiently sorts resource requests (i.e., PCI I/O and memory address requests) into a minimum number of address space apertures, which are allocated. This bin-based allocation scheme may employ address space apertures at the PCI root bridge level, or may use finer granularity, making address assignments at lower bridge levels.

Figure 5:
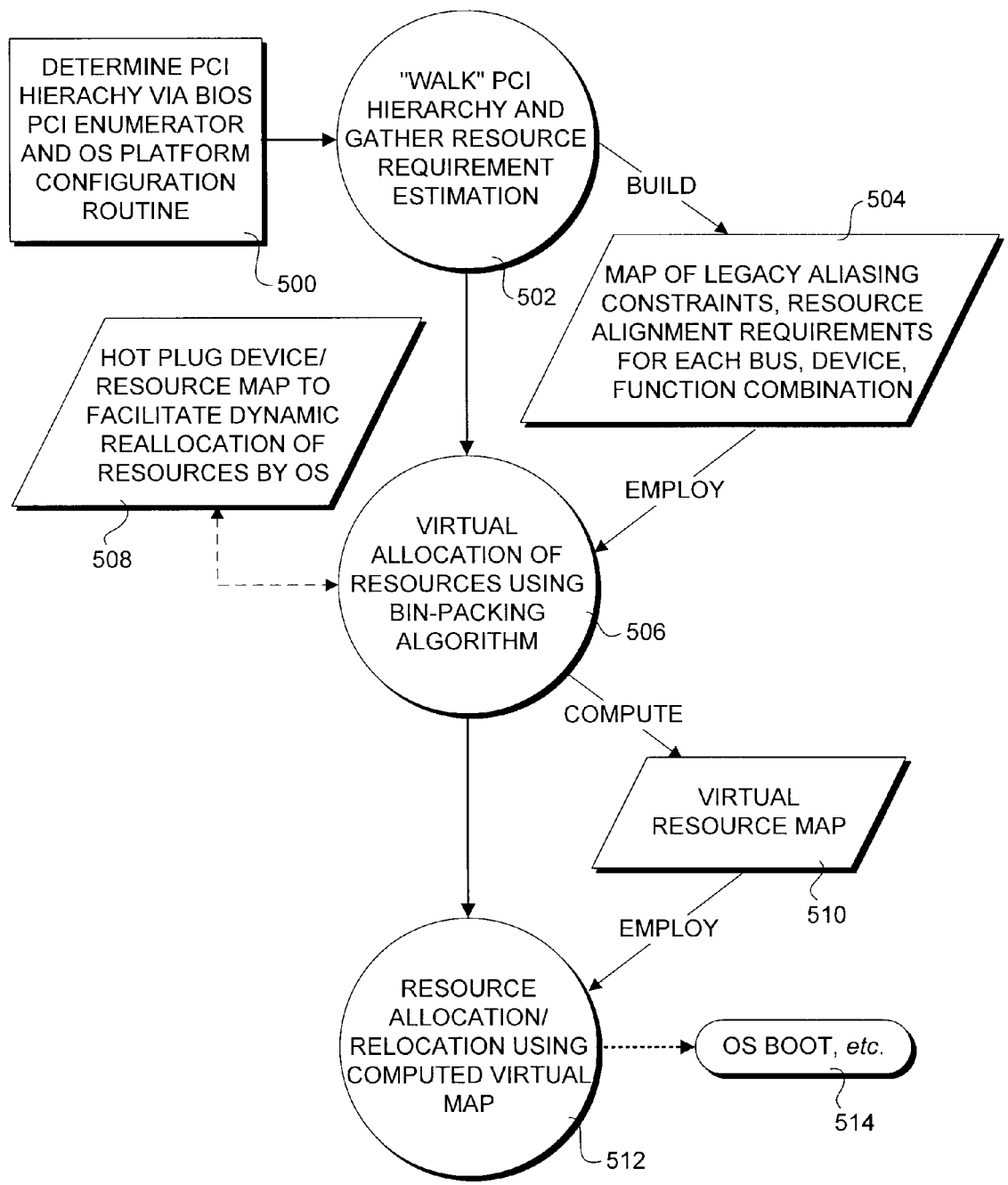
FIG. 5 is a flowchart/state diagram illustrating operations performed during PCI resource allocation in accordance with one embodiment of the invention.

With reference to FIG. 5, PCI I/O and memory address space allocations in accordance with one embodiment is performed as follows. In general, an instance of the process will be performed for each of the PCI I/O and PCI memory address space requests. The principles for allocation of PCI I/O and PCI memory resources are essentially the same, with only the size of the address space apertures and alignment requirements differing.

The process begins in a block 500, wherein, the PCI devices and hierarchy is determined through the platform's BIOS PCI enumerator and the operation system's platform configuration routine. These operations are well-known to those skilled in the PCI arts, so no further details are provided herein.

In a state block 502 the PCI hierarchy is "walked" and the resource requirements for each PCI device (e.g., peripheral, PCI bridge, etc.) is gathered. This is performed in a similar manner to blocks 402 and 404 discussed above. As before, alignment requirements must be maintained. Accordingly, in connection with the operations of state block 502, a map 504 is built containing resource alignment requirements for each bus, device, and function combination.

Furthermore, in one embodiment map 504 further contains legacy aliasing constraints. Legacy aliasing creates holes in I/O space. For example, on some server platforms, the SNC masks off the top 6 bits [15:10] of an I/O transaction to decide if the lower 10 bits match a VGA I/O address. If so the transaction is marked as a VGA transaction and diverted to the VGA device. For instance, I/O transactions addressed to 0XABC0 shall be going to 0x3C0. These mappings are stored in map 504

Continuing with the process, in a second state block 506, virtual allocation of resources is performed using a bin-packing algorithm discussed in detail below. The virtual allocation of resources (i.e., address spaces) to virtual addresses is performed in a manner that minimizes the amount of address space required to support all of the resource requests. In addition to packing considerations, the allocations are made in consideration of the alignment requirements of map 504.

In one embodiment, the allocations are made in further considerations to support dynamic reallocation of resources for hot-plug devices. Briefly, hot-plug devices typically comprise add-on peripherals such as disk drives and the like that can be added or removed without shutting down a platform. Under conventional practices, removal of a malfunctioning hot plug device may not result in reclaiming memory resources allocated for that device without a system reset. First, system resets are costly, and second, depleted resources may prevent or limit the addition of replacement of hot-plug devices.

In conjunction with allocations for hot-plug devices, an optional hot plug device/resource map 610 is built. These data map resource allocation requests to corresponding hot-plug devices. The hot-plug device allocations may apply to existing devices and/or existing and potential hot-plug devices that may be attached to the system during subsequent system operations. Under one embodiment, allocations for hot plug devices are taken offline (i.e., considered separately from all non hot-plug PCI devices) and a separate reserved address space is allocated after or in connection with the allocation of resources for the PCI devices described below. Optionally, hot-plug device resource allocations may be considered along with the other PCI devices.

During the operations of state block 506, a virtual resource map 508 is created. The virtual resource map contains information identifying where resources (i.e.,) address space allocations for each PCI device are to be mapped in the systems address space. Depending on the level of granularity employed, resources may be mapped to offsets and base addresses corresponding to root bridge levels, or even sub-bridge levels.

The process is completed in a state block 512, where actual address allocations (and/or reallocations) are performed using virtual resource map 510. For PCI devices, such as add-on cards, the base address register (BAR) of the device is programmed with the base address assigned to the device. Programming the BAR enables access to individual memory addresses based on the offsets from the BAR to those addresses. Thus, all allocated addresses for a given device may be made via an address that is equivalent to the BAR plus a corresponding offset. After resource allocation has occurred, continuing operations in connection with OS initialization, including an OS boot, are performed, as depicted by a continuation block 514.

The foregoing operations are performed for both PCI I/O resource and PCI memory address space allocation. As the boundaries and generally request sizes for these two are different (PCI I/O requests are generally much smaller than PCI memory requests), the resource allocations for each type of resource should generally be considered separately.

As discussed above, embodiments of the invention employ a bin-packing algorithm to determine the virtual address space locations (i.e., base addresses) for various PCI peripheral devices and root bridges. The bin-packing algorithm is based on a solution to the classic bin-packing problem, which in turn is a special case of the more general knapsack problem. In non-mathematical terms, the definition of the knapsack problem states, "Given items of different values and volumes, find the most valuable set of items that fit in a knapsack of fixed volume." Furthermore, the definition of the bin-packing problem states, "Determine how to put the most objects in the least number of fixed space bins." More formally, find a partition and assignment of a set of objects such that a constraint is satisfied or an objective function is minimized (or maximized). A common form of the problem is, "what is the least number of bins (i.e., containers of fixed volume) needed to hold a set of objects)?"

Figure 6:
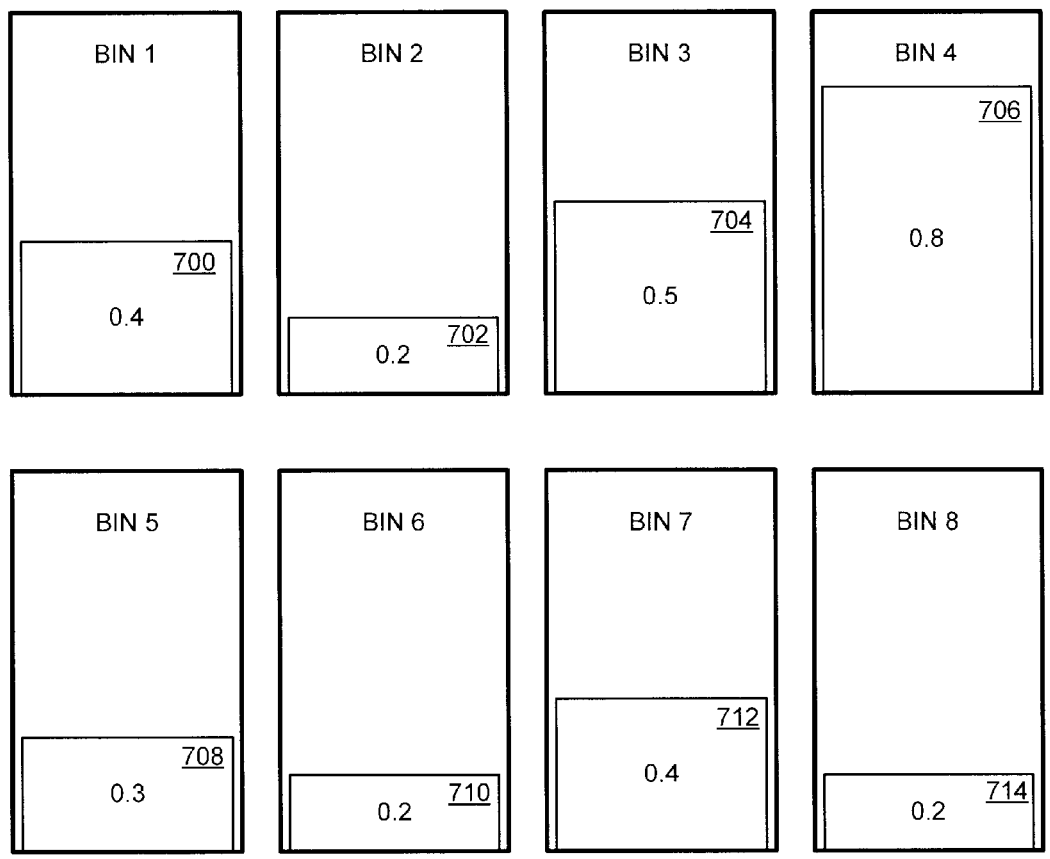
FIG. 6 is a schematic diagram illustrating how resource request objects are stored in respective address space apertures (i.e., bins) under a conventional resource allocation scheme.

Under one conventional scheme in accordance with the "on the fly" allocation scheme of FIG. 4, address space is allocated on a block-wise basis for respective PCI root bridges. For example, the result of this technique for a system having 8 PCI root bridges is shown in FIG. 6. Each of resource request objects 700, 702, 704, 706, 708, 710, 712, and 714 are stored in a respective memory block and have a normalized size corresponding to the amount of address space that is required for the PCI devices and bridges under its corresponding PCI root bridge. At the same, time, each block, which corresponds to a respective bin, has a normalized size set to 1.0. As illustrated, the normalized sizes of resource request objects 700, 702, 704, 706, 708, 710, 712, and 714 are 0.4, 0.2, 0.5, 0.8, 0.3, 0.2, 0.4, and 0.2, respectively. It is clear that much of the address space in the bins remains unused.

In accordance with one aspect of the invention, the consumed address space is coalesced using a bin-packing algorithm shown in FIG. 8, with the net result shown in FIG. 8. The bin-packing algorithm, known as the $K^{th}$ approximation for the knapsack, employs a recursive technique to order the bin packing so as to require the least number of bins to store all of the resource request objects. The algorithm uses a fixed K<n (# of requests in the root-bridge hierarchy), whose size is less than C, the root bridge aperture (i.e., the largest size that may be allocated to a single root bridge, also equivalent to the bin (or knapsack) size).

Figure 7:
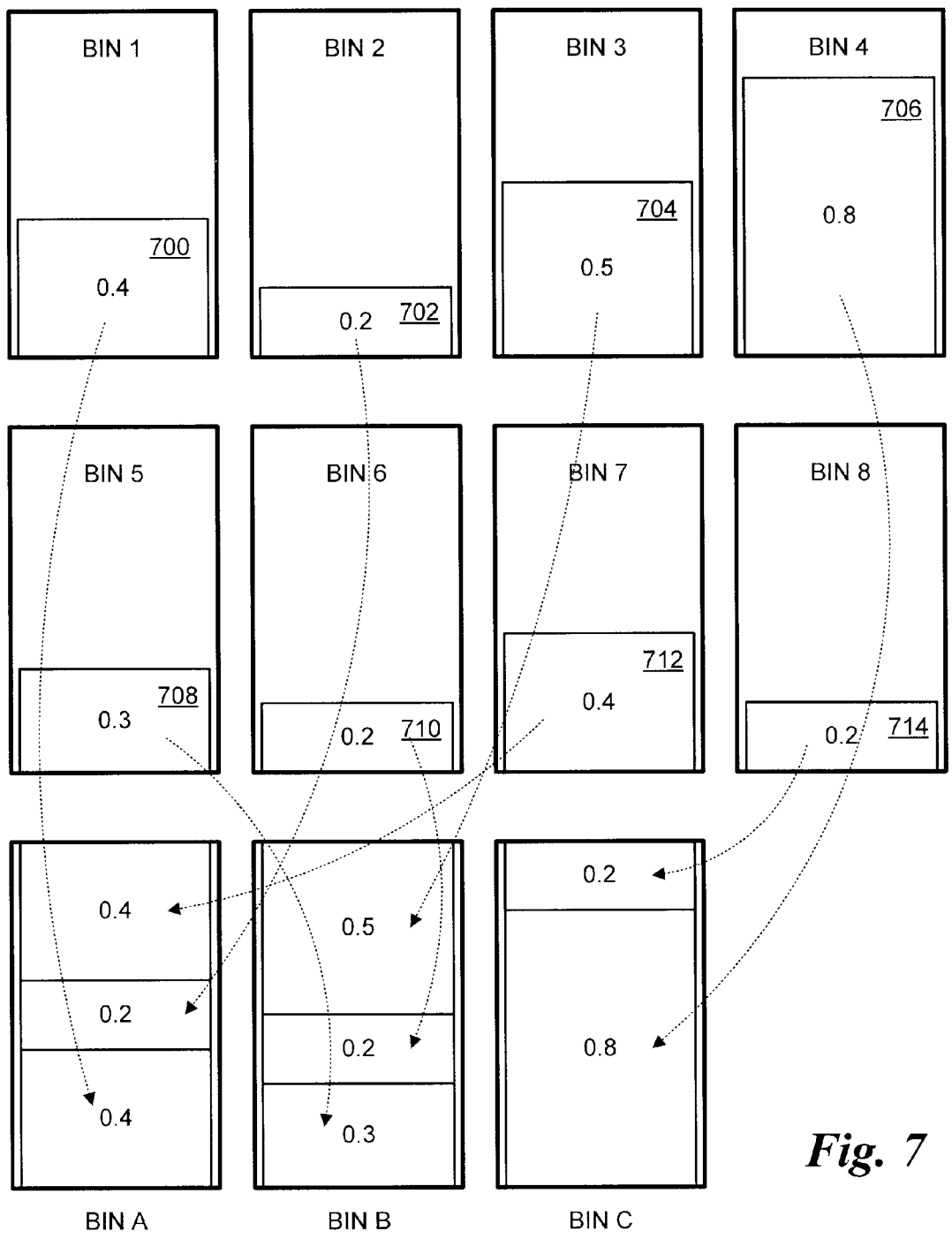
FIG. 7 is a schematic diagram illustrating how the resource request objects are packed into a minimum number of bins via implementation of a bin-packing algorithm in accordance with one embodiment of the invention.

As shown in FIG. 7, implementation of the bin-packing algorithm enables the same objects shown in FIG. 6, which occupied 8 bins, to be packed into only 3 bins of the same size. Thus, the amount of address space allocated to the particular PCI resource (PCI I/O or memory) is greatly reduced.

The foregoing resource allocation scheme need not be limited to PCI root bridge level allocations, but may be applied to lower levels in the hierarchy. For instance, resource requests may be aggregated at the bridge levels immediately below a given PCI root bridge. Thus, the bin-packing resource allocation scheme may be implemented for systems that only have a single PCI root bridge.

Figure 9:
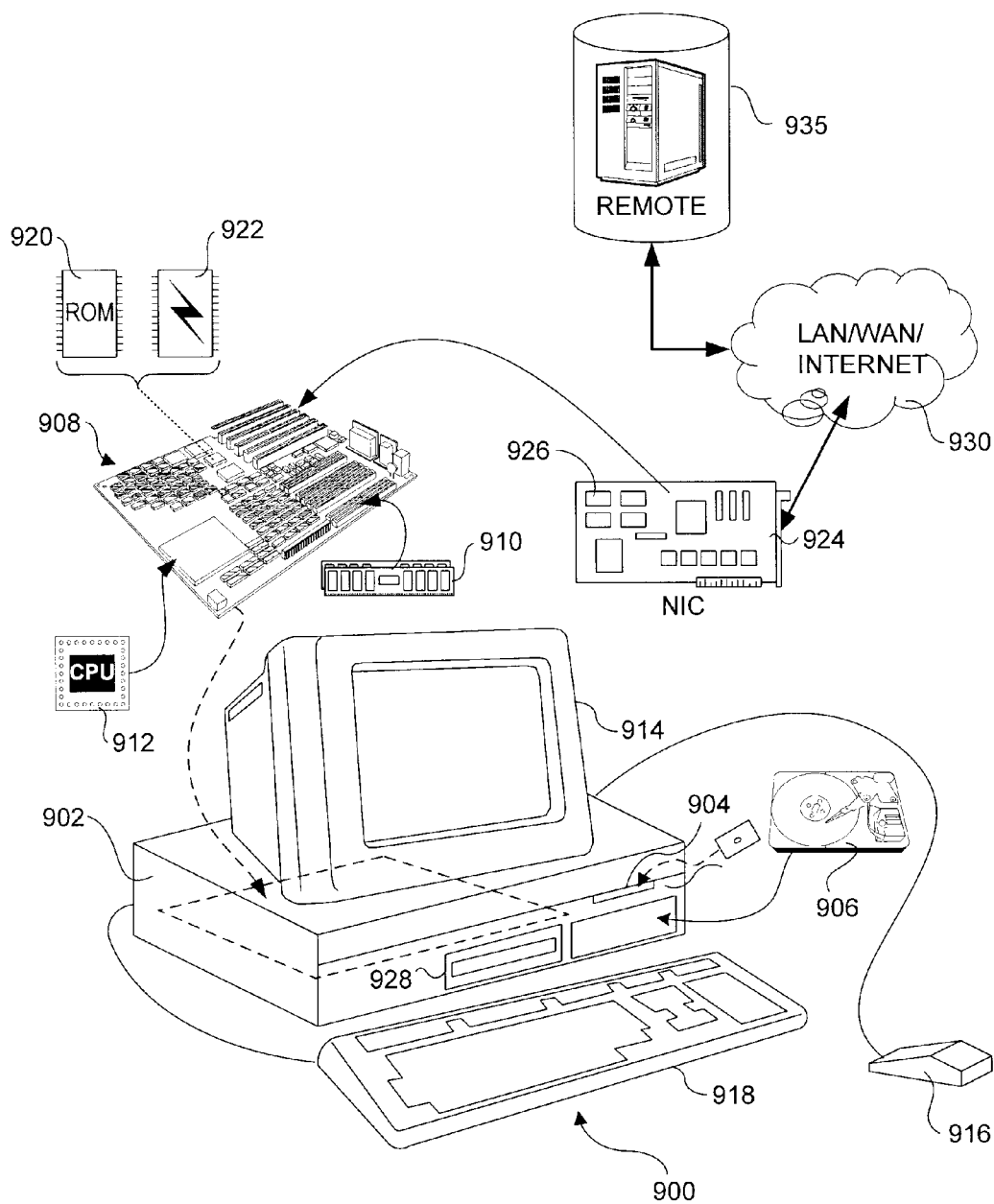
FIG. 9 is a schematic diagram of a computer system via which embodiments of the invention may be implemented.

FIG. 9 illustrates an embodiment of an exemplary computer system 900 to practice embodiments of the invention described above. Computer system 900 is generally illustrative of various types of computer devices, including personal computers, laptop computers, workstations, servers, etc. For simplicity, only the basic components of the computer system are discussed herein. Computer system 900 includes a chassis 902 in which various components are housed, including a floppy disk drive 904, a hard disk 906, a power supply (not shown), and a motherboard 908. Hard disk 906 may comprise a single unit, or multiple units, and may optionally reside outside of computer system 900. The motherboard 908 includes a memory 910 coupled to one or more processors 912. Memory 910 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Processor 912 may be a conventional microprocessor including, but not limited to, a CISC (complex instruction set computer) processor, such as an Intel Corporation x86, Pentium, or Itanium family microprocessor, a Motorola family microprocessor, or a RISC (reduced instruction set computer) processor, such as a SUN SPARC processor or the like.

The computer system 900 also includes one or more non-volatile memory devices on which firmware is stored. Such non-volatile memory devices include a ROM device 920 or a flash device 922. Other non-volatile memory devices include, but are not limited to, an Erasable Programmable Read Only Memory (EPROM), an Electronically Erasable Programmable Read Only Memory (EEPROM), or the like. The computer system 900 may include other firmware devices as well (not shown).

A monitor 914 is included for displaying graphics and text generated by firmware, software programs and program modules that are run by computer system 900, such as system information presented during system boot. A mouse 916 (or other pointing device) may be connected to a serial port, USB (Universal Serial Bus) port, or other like bus port communicatively coupled to processor 912. A keyboard 918 is communicatively coupled to motherboard 908 in a similar manner as mouse 916 for user entry of text and commands. In one embodiment, computer system 900 also includes a network interface card (NIC) or built-in NIC interface (not shown) for connecting computer system 900 to a computer network 930, such as a local area network (LAN), wide area network (WAN), or the Internet. In one embodiment, network 930 is further coupled to a remote computer 935, such that computer system 900 and remote computer 935 can communicate. In one embodiment, a portion of the computer system's firmware is loaded during system boot from remote computer 935.

The illustrated embodiment further includes an optional add-in card 924 that is coupled to an expansion slot of motherboard 908. In one embodiment, add-in card 924 includes an Option ROM 926 on which firmware is stored. Computer system 900 may also optionally include a compact disk-read only memory ("CD-ROM") drive 928 into which a CD-ROM disk may be inserted so that executable files, such as an operating system, and data on the disk can be read or transferred into memory 910 and/or hard disk 906. Other mass memory storage devices may be included in computer system 900.

In another embodiment, computer system 900 is a handheld or palmtop computer, which are sometimes referred to as Personal Digital Assistants (PDAs). Handheld computers may not include a hard disk or other mass storage, and the executable programs are loaded from a corded or wireless network connection into memory 910 for execution by processor 912. A typical computer system 900 will usually include at least a processor 912, memory 910, and a bus (not shown) coupling the memory 910 to the processor 912.

It will be appreciated that in one embodiment, computer system 900 is controlled by operating system software that includes a file management system, such as a disk operating system, which is part of the operating system software. For example, one embodiment of the present invention utilizes Microsoft Windows® as the operating system for computer system 900. In another embodiment, other operating systems such as, but not limited to, an Apple Macintosh® operating system, a Linux-based operating system, the Microsoft Windows CE® operating system, a Unix-based operating system, the 3Com Palm® operating system, or the like may also be use in accordance with the teachings of the present invention.

Thus, embodiments of this invention may be used as or to support a firmware and software code executed upon some form of processing core (such as processor 912) or otherwise implemented or realized upon or within a machine-readable storage medium. A machine-readable storage medium may include, but is not limited to, floppy diskettes, optical disks, CO-ROMs, and magneto-optical disks, ROMs, RAMs, EPROMs, EEPROMs, magnet or optical cards, flash memory, any other mechanism that stores information in a form readable by a machine (e.g., a computer, network device, personal digital assistant, manufacturing too, any device with a set of one or more processors, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   determining a PCI (Peripheral Component Interconnect) hierarchy corresponding to PCI devices hosted by a computer platform;
   gathering from the PCI hierarchy resource requests for the PCI devices;
   building a map of resource alignment requirements for the PCI devices;
   computing a virtual resource map that maps the resource requests to resource allocations in a manner that minimizes the amount of address space in which the resource allocations will fit based on the resource alignment requirements and sizes of the resource requests; and
   allocating resources for the PCI devices based on the virtual resource map, including
      aggregating the resource requests for PCI devices at a given level of the PCI hierarchy into respective resource request objects, each resource request object having a size corresponding to the aggregated resource requests of the PCI devices to which it corresponds,
      defining a bin size comprising an address space aperture corresponding to a resource type of the resource requests, and
      sorting, via a bin-packing algorithm, the resource request objects into appropriate bins to minimize the number of bins required to support the resource requests for all of the PCI devices hosted by the computer platform.

2. The method of claim 1, wherein the resource requests pertain to PCI input/output (I/O) address requests.

3. The method of claim 1, wherein the resource requests pertain to PCI memory onboard PCI devices that are mapped into the computer platform address space via the resource allocation.

4. The method of claim 1, further comprising allocating a reserved portion of address space for hot-plug devices.

5. The method of claim 1, wherein the resource request objects correspond to resource request aggregations at a PCI root bridge level.

6. The method of claim 1, wherein the resource request objects correspond to resource request aggregations at a hierarchy level below a PCI root bridge level.

7. The method of claim 1, further comprising performing legacy aliasing, wherein resources are mapped to the address space in a manner that accounts for legacy device addressing considerations.

8. A computer-readable storage medium having instructions stored thereon which when executed by one or more processors perform a method comprising:
   determining a PCI (Peripheral Component Interconnect) hierarchy corresponding to PCI devices hosted by a computer platform;
   gathering from the PCI hierarchy resource requests for the PCI devices;
   building a map of resource alignment requirements for the PCI devices;
   computing a virtual resource map that maps the resource requests to resource allocations in a manner that minimizes the amount of address space in which the resource allocations will fit based on the resource alignment requirements and sizes of the resource requests; and
   allocating resources for the PCI devices based on the virtual resource maps, including
      aggregating the resource requests for PCI devices at a given level of the PCI hierarchy into respective resource request objects, each resource request object having a size corresponding to the aggregated resource requests of the PCI devices to which it corresponds,
      defining a bin size comprising an address space aperture corresponding to a resource type of the resource requests, and
      sorting, via a bin-packing algorithm, the resource request objects into appropriate bins to minimize the number of bins required to support the resource requests for all of the PCI devices hosted by the computer platform.

9. The computer-readable storage medium of claim 8, wherein the resource requests pertain to PCI input/output (I/O) address requests.

10. The computer-readable storage medium of claim 8, wherein the resource requests pertain to PCI memory onboard PCI devices that are mapped into the computer platform address space via the resource allocation.

11. The computer-readable storage medium of claim 8, the method further comprising allocating a reserved portion of address space for hot-plug devices.

12. The computer-readable storage medium of claim 8, wherein the resource request objects correspond to resource request aggregations at a PCI root bridge level.

13. The computer-readable storage medium of claim 8, wherein the resource request objects correspond to resource request aggregations at a hierarchy level below a PCI root bridge level.

14. The computer-readable storage medium of claim 8, the method further comprising performing legacy aliasing, wherein resources are mapped to the address space in a manner that accounts for legacy device addressing considerations.

* * * * *